Sept. 21, 1948.　　　　C. C. KNITTER　　　　2,449,782
BICYCLE STOPLIGHT
Filed Nov. 19, 1946
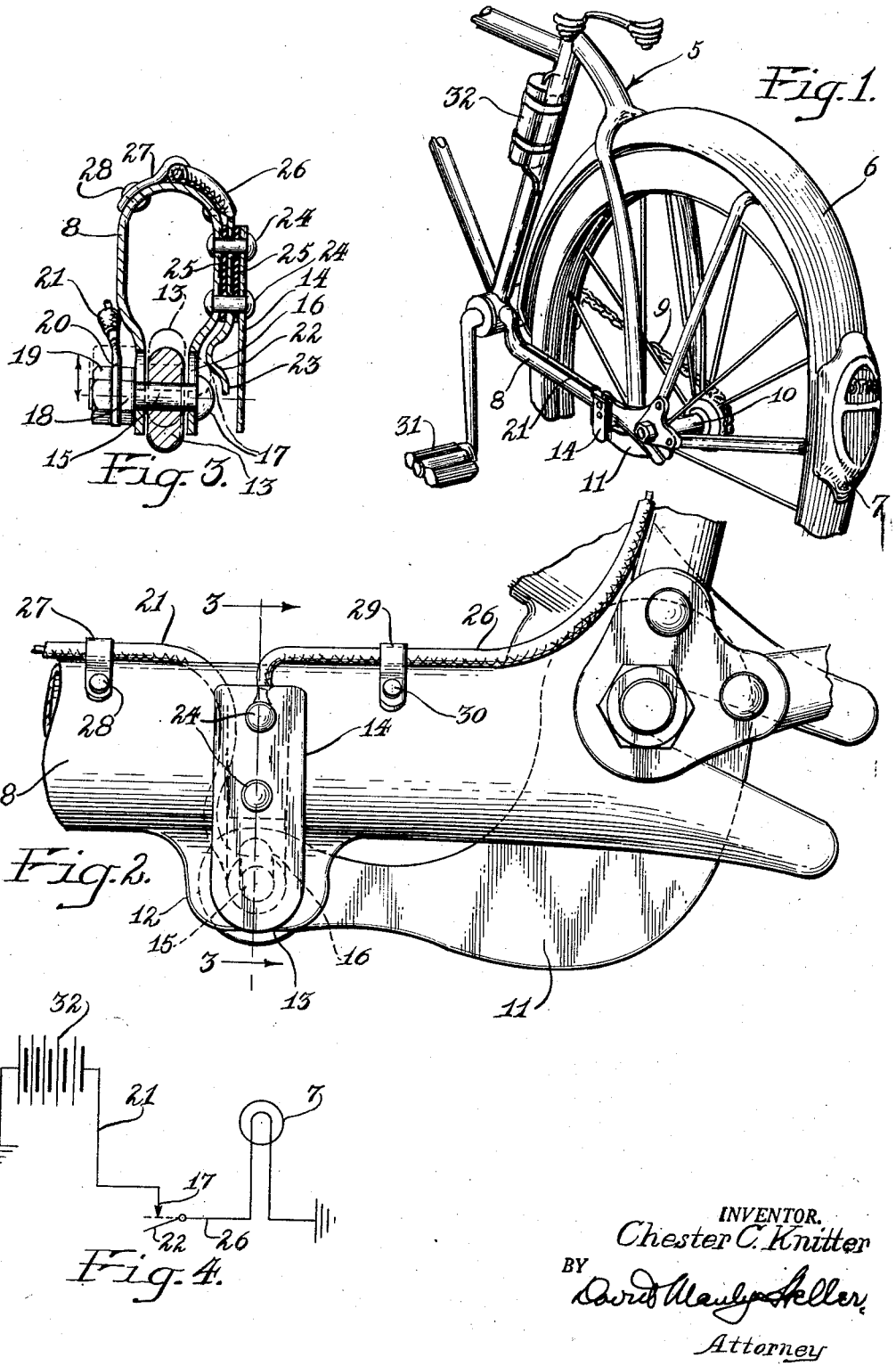
INVENTOR.
Chester C. Knitter
BY
David Manly Keller
Attorney Patented Sept. 21, 1948

2,449,782

UNITED STATES PATENT OFFICE 2,449,782

BICYCLE STOPLIGHT

Chester C. Knitter, Chicago, Ill.

Application November 19, 1946, Serial No. 710,766

1 Claim. (Cl. 200—52)

My invention relates to stoplight equipment, or accessories, for bicycles or other similar conveyances.

An important object of my invention is to provide a stoplight structure secured at the rear end of the bicycle, and connected to switching means working in concert with the brake lever, when the said brake is being applied to the moving bicycle.

Another object of my invention is to provide a modified framework structure adapting the same to be receptive to specific switching means secured to one end of the brake lever, and operating in slotted means for effectuating, or breaking electrical contact.

A further object of my invention is to provide an accessory of the aforementioned character which is practical in construction, simple to attach, and connect to a bicycle conveyance, and a construction which is of such simple, elemental arrangement as to lend itself readily to economical manufacture in quantity production.

Other features, objects, and advantages inherent in my invention will become apparent from an examination of the accompanying drawings, bearing further elucidation and exposition in the ensuing description, wherein like symbols are used to designate like parts, and in which;

Fig. 1 is a perspective view of the rear end of a bicycle construction.

Fig. 2 is an enlarged front view of the mechanism for making and breaking the electrical circuit, also depicting the brake lever comprising the elemental structure of my invention.

Fig. 3 is a cross-sectional view taken, substantially, on the lines 3—3 of Fig. 2.

Fig. 4 is an electrical wiring diagram illustrating the method of connecting the wiring for the stoplight, and switching mechanism used in the construction representing my invention.

Referring to the various views, 5 generally designates a bicycle, having a rear mud guard 6 to which is attached the conventional stoplight 7 having also as part of its lower framework, a horizontal bar support 8, which furnishes the pivotal support for the rear wheel hub 10, driven by chain transmission 9, operated by the pedals 31.

At the rear of the structure, as shown in Fig. 2, the brake pedal 11, of conventional construction, is mounted so as to effectuate a braking action when the pedals 31 are operated in a direction contra to the direction for propelling the bicycle forward. The said action will motivate the brake lever 11, thus causing its forward end 13 to be motivated upwardly, while guided within the slotted portions 16 formed in the end 12 of the bar support 8. The end 13 of the brake lever 11 holds firmly the rivet structure 15, having a contact head portion 17, and having secured at its other terminus, which is threaded, the locknuts 18 and 19, which act as binding posts for the terminal 20 of the wire 21 connected to the battery 32. The other terminal 22 is provided with an arcuately formed extension 23 so as to provide effectual "make" and "break" of contact with the rivet contact head 17, whenever the lever end 13 is moved upwardly by virtue of the reversal of the movement of the pedals 31 putting on the brake so as to arrest movement of the bicycle. The said contact, or terminal 22, is secured against the side of the bar 8, and insulated therefrom by insulation 25, being firmly held in place by the rivet 24. A guard 14 may be secured thereover so as to conceal and protect the contacting elements, or terminals 23 and 17. The terminal 22 is connected to a wire 26 and is held in place by means of a clip 29, in turn secured by means of a screw or other similar fastening 30, whereas the wire 21 is held in place by a similar clip 27 secured to the bicycle framework by means of a fastening or screw 28.

When it is desired to arrest the movement of the bicycle, the pedals 31 are rotated backwardly, causing the brake lever 11 to be actuated effectively operating the brake, simultaneously making contact between the contact head 17, and the terminal portion 23, simultaneously closing the electrical circuit and lighting up the stoplight, thus acting as a signal to individuals, or traffic rearwardly of the bicycle 5.

I believe, I have herein described, rather succinctly, the nature and the operation of my invention, and inasmuch as the same is susceptible of modifications and improvements, I reserve the right to all modifications and improvements falling within the scope and spirit of my invention, or those embraced in the accompanying drawings, as well as any that may fall within the purview of the foregoing description; my invention to be limited only to the appended claim.

Having thus described and disclosed my invention, what I claim as novel and desire to secure by Letters Patent, is:

In a device of the character described including bicycle brake means provided with a brake lever, electrical contact means of hemispherical configuration secured to the said brake lever, a pair of guiding ears on the bicycle frame adjacent the free end of the said brake lever and provided with elongated slotted portions confining the said electrical contact means to limited movement, single resilient contact means of partially spherical configuration secured to the said bicycle frame and insulated therefrom, a protective cover plate secured over the said resilient contact means, and binding post means on the said electrical contact means and the said resilient contact means for effective connection to an electrical circuit, the actuation of the said brake lever effectuating a closed circuit, the said circuit remaining open normally and during the period when the said brake means is in inoperative position.

CHESTER C. KNITTER.

REFERENCES CITED

The following references are of record in the file of this patent:

UNITED STATES PATENTS

| Number | Name | Date |
|---|---|---|
| 2,079,153 | Cote | May 4, 1937 |
| 2,090,805 | Oliver | Aug. 24, 1937 |
| 2,222,075 | Johnston | Nov. 19, 1942 |
| 2,271,664 | Sarchino | Feb. 3, 1942 |
| 2,358,751 | Waugh | Sept. 19, 1944 |